(12) United States Patent
Lee

(10) Patent No.: US 9,124,811 B2
(45) Date of Patent: Sep. 1, 2015

(54) APPARATUS AND METHOD FOR PROCESSING IMAGE BY WIDE DYNAMIC RANGE PROCESS

(71) Applicant: SAMSUNG TECHWIN CO., LTD., Changwon (KR)

(72) Inventor: Chang-Min Lee, Changwon (KR)

(73) Assignee: SAMSUNG TECHWIN CO., LTD., Changwon (KR)

( * ) Notice: Subject to any disclaimer, the term of this patent is extended or adjusted under 35 U.S.C. 154(b) by 145 days.

(21) Appl. No.: 13/935,609

(22) Filed: Jul. 5, 2013

(65) Prior Publication Data

US 2014/0198226 A1   Jul. 17, 2014

(30) Foreign Application Priority Data

Jan. 17, 2013   (KR) .......................... 10-2013-0005428

(51) Int. Cl.
  *H04N 5/228*  (2006.01)
  *G03B 17/00*  (2006.01)
  *G06K 9/00*   (2006.01)
  *H04N 5/235*  (2006.01)
  *H04N 5/232*  (2006.01)

(52) U.S. Cl.
  CPC ......... *H04N 5/2355* (2013.01); *H04N 5/23254* (2013.01); *H04N 5/23267* (2013.01)

(58) Field of Classification Search
  CPC ............ H04N 5/23232; H04N 5/2355; H04N 5/23229; H04N 1/60; H04N 5/355; H04N 5/35509; H04N 5/35518; H04N 5/35536
  USPC ................ 348/222.1, 229.1, 221.1, 362–366; 382/107; 396/153
  See application file for complete search history.

(56) References Cited

U.S. PATENT DOCUMENTS

| 4,748,673 | A  | * | 5/1988  | Barre et al. ................... 382/139 |
| 6,078,357 | A  | * | 6/2000  | Yamamoto et al. .......... 348/234 |
| 6,593,970 | B1 | * | 7/2003  | Serizawa et al. ............. 348/362 |
| 6,677,992 | B1 | * | 1/2004  | Matsumoto et al. ....... 348/229.1 |
| 7,466,358 | B1 | * | 12/2008 | Kusaka et al. ................ 348/362 |
| 2002/0057845 | A1 | * | 5/2002 | Fossum et al. ................ 382/270 |
| 2003/0197805 | A1 | * | 10/2003 | Serizawa et al. ............. 348/362 |
| 2003/0206241 | A1 | * | 11/2003 | Serizawa et al. ............. 348/362 |
| 2005/0169555 | A1 | * | 8/2005  | Hasegawa ..................... 382/284 |
| 2006/0115182 | A1 | * | 6/2006  | Deng et al. .................... 382/284 |

(Continued)

FOREIGN PATENT DOCUMENTS

KR        10-0672856 B1      1/2007
KR    10-2011-0032402 A      3/2011

*Primary Examiner* — Chia-Wei A Chen
(74) *Attorney, Agent, or Firm* — Sughrue Mion, PLLC

(57) ABSTRACT

An apparatus and method for processing an image by a wide dynamic range (WDR) process, and for obtaining an image having a wide dynamic area by using a WDR process. The method includes: receiving a long exposure image and a short exposure image having different exposure times; detecting a motion artifact area that may be occur when the long exposure image and the short exposure image are fused; generating a non-linear gain control short exposure image by non-linearly adjusting a gain of the short exposure image such that a luminance component of the short exposure image corresponds to a luminance component of the long exposure image; compensating for motion in the non-linear gain control exposure image based on the detected motion artifact area; and fusing the non-linear gain control short exposure image and the long exposure image to output an image to which a WDR process is performed.

19 Claims, 14 Drawing Sheets

(56) References Cited

U.S. PATENT DOCUMENTS

| | | | |
|---|---|---|---|
| 2006/0268155 A1* | 11/2006 | Takagi et al. | 348/370 |
| 2007/0097240 A1* | 5/2007 | Egawa et al. | 348/308 |
| 2007/0109317 A1* | 5/2007 | Minakuchi et al. | 345/604 |
| 2008/0252750 A1* | 10/2008 | Ogawa | 348/229.1 |
| 2008/0278610 A1* | 11/2008 | Boettiger | 348/273 |
| 2008/0291313 A1* | 11/2008 | Krymski | 348/308 |
| 2009/0040364 A1 | 2/2009 | Rubner et al. | |
| 2009/0046947 A1* | 2/2009 | Kobayashi | 382/284 |
| 2009/0086056 A1* | 4/2009 | Asoma | 348/229.1 |
| 2009/0086061 A1* | 4/2009 | Asoma | 348/241 |
| 2009/0175518 A1* | 7/2009 | Ikuma et al. | 382/128 |
| 2009/0180704 A1* | 7/2009 | Wey et al. | 382/254 |
| 2009/0220141 A1* | 9/2009 | Aoki et al. | 382/134 |
| 2010/0054705 A1* | 3/2010 | Okamoto et al. | 386/95 |
| 2010/0061653 A1* | 3/2010 | Huang et al. | 382/274 |
| 2010/0066858 A1* | 3/2010 | Asoma | 348/229.1 |
| 2010/0097493 A1* | 4/2010 | Asoma | 348/229.1 |
| 2010/0172555 A1* | 7/2010 | Hasezawa et al. | 382/128 |
| 2010/0259689 A1* | 10/2010 | Tanaka et al. | 348/708 |
| 2010/0277631 A1* | 11/2010 | Sugiyama | 348/297 |
| 2010/0315539 A1* | 12/2010 | Azuma et al. | 348/265 |
| 2011/0007185 A1* | 1/2011 | Yonaha et al. | 348/239 |
| 2011/0063483 A1* | 3/2011 | Rossi et al. | 348/294 |
| 2011/0069199 A1* | 3/2011 | Yamazaki | 348/229.1 |
| 2011/0069906 A1 | 3/2011 | Park et al. | |
| 2011/0254976 A1 | 10/2011 | Garten et al. | |
| 2012/0201455 A1* | 8/2012 | Kodavalla et al. | 382/167 |
| 2012/0212645 A1* | 8/2012 | Ogawa | 348/229.1 |
| 2012/0268632 A1* | 10/2012 | Kamon et al. | 348/294 |
| 2012/0274798 A1* | 11/2012 | Takahashi et al. | 348/222.1 |
| 2012/0327270 A1* | 12/2012 | Shirakawa et al. | 348/239 |
| 2013/0050520 A1* | 2/2013 | Takeuchi | 348/222.1 |
| 2013/0076935 A1* | 3/2013 | Morita | 348/222.1 |
| 2013/0077159 A1* | 3/2013 | Tani | 359/387 |
| 2013/0242122 A1* | 9/2013 | Toyoda | 348/208.6 |
| 2013/0335438 A1* | 12/2013 | Ward | 345/589 |
| 2014/0049657 A1* | 2/2014 | Fukunishi | 348/208.4 |
| 2014/0232830 A1* | 8/2014 | Ichige | 348/47 |
| 2014/0240587 A1* | 8/2014 | Cote et al. | 348/371 |
| 2014/0313400 A1* | 10/2014 | Kaizu et al. | 348/362 |
| 2014/0320695 A1* | 10/2014 | Ozawa et al. | 348/229.1 |
| 2014/0321766 A1* | 10/2014 | Jo | 382/255 |
| 2014/0340550 A1* | 11/2014 | Kaizu et al. | 348/296 |

* cited by examiner

Prior Art

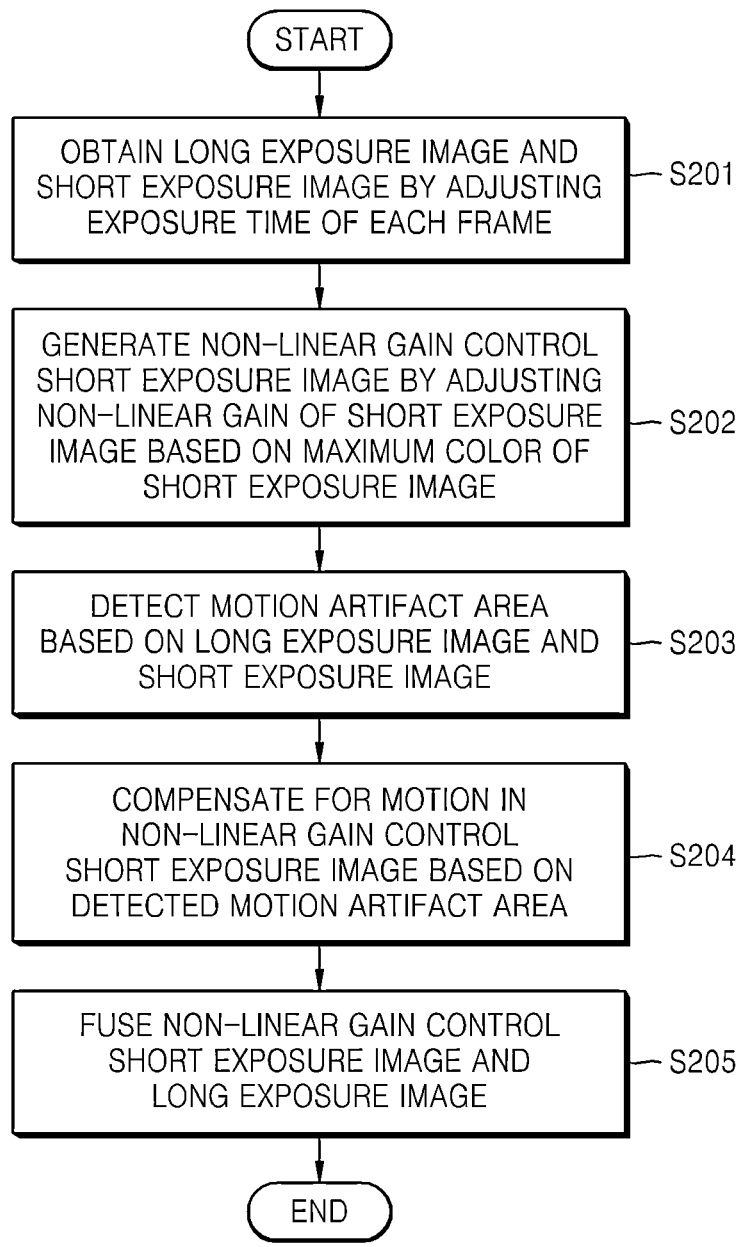

FUSION IMAGE (INCLUDING MOTION BLURR)

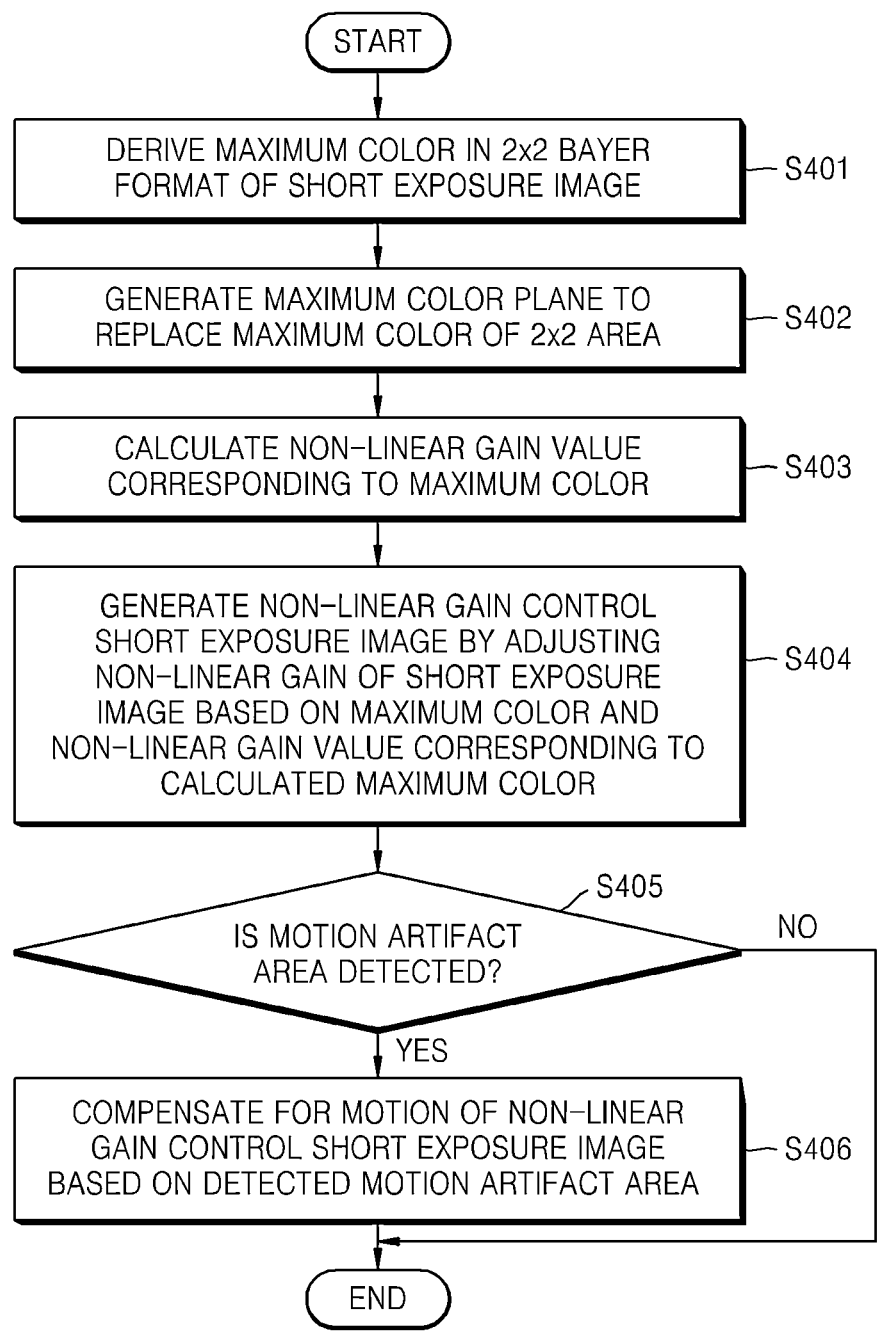

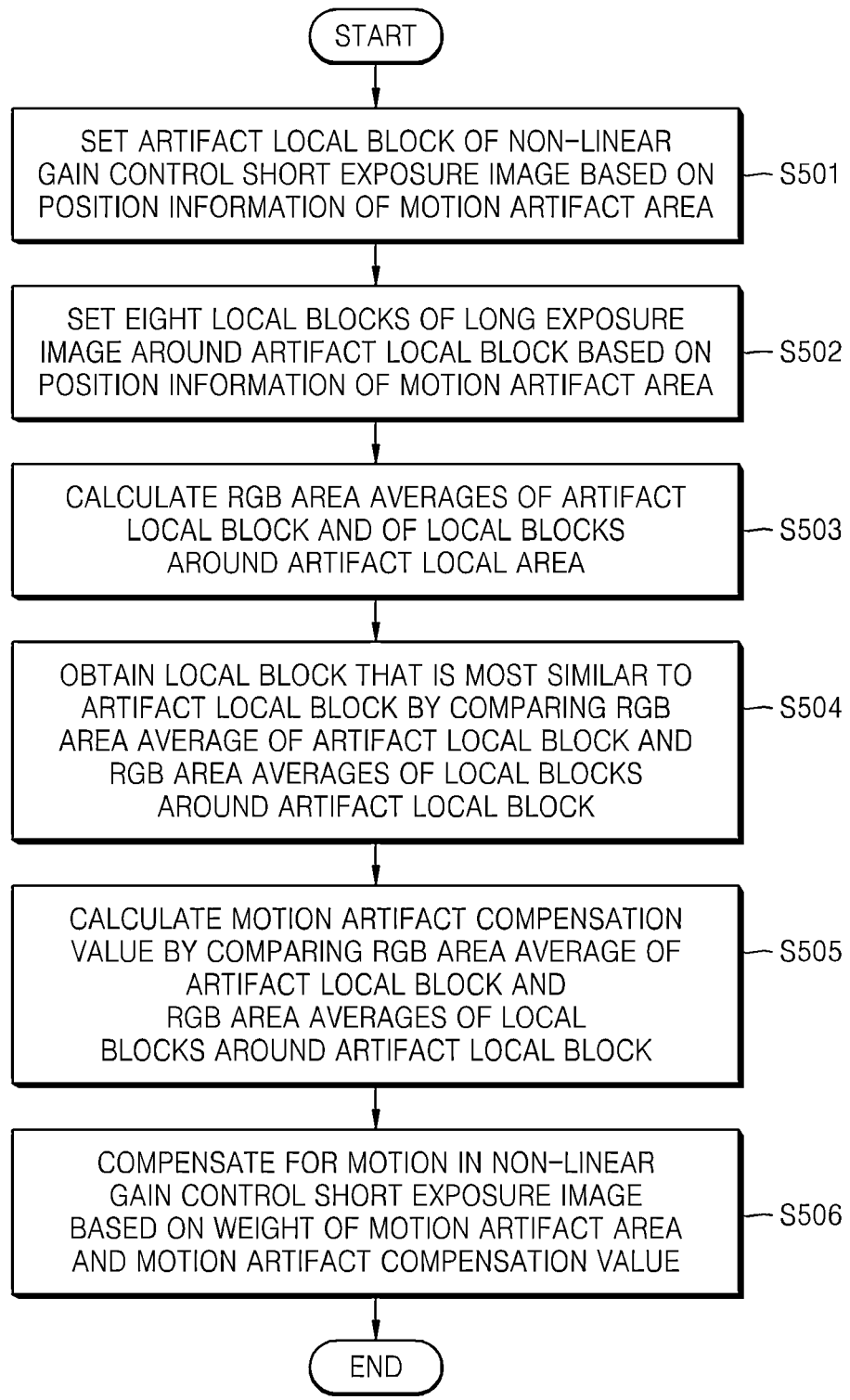

APPARATUS AND METHOD FOR PROCESSING IMAGE BY WIDE DYNAMIC RANGE PROCESS

CROSS-REFERENCE TO RELATED PATENT APPLICATION

This application claims the benefit of Korean Patent Application No. 10-2013-0005428, filed on Jan. 17, 2013, in the Korean Intellectual Property Office, the disclosure of which is incorporated herein in its entirety by reference.

BACKGROUND OF THE INVENTION

1. Field of the Invention

Apparatuses and methods consistent with exemplary embodiments relate to processing an image, and more particularly, to processing an image, whereby an image having a wide dynamic area is obtained by a wide dynamic range (WDR) process.

2. Description of the Related Art

Recently, user demand for digital image processing apparatuses, such as digital cameras, digital camcorders, and camera phones, is rapidly increasing. Accordingly, the digital image processing apparatuses become more sophisticated and have added more diverse functions.

However, because the digital image processing apparatuses obtain a dynamic area having a relatively small area compared to a dynamic area of an actual screen, the digital image processing apparatuses are not capable of processing all information of the actual screen. In particular, when obtaining an image under a condition in which a difference in luminance intensities between a bright portion and a dark portion of an image is large due to backlight, it is difficult to obtain sufficient information regarding both the bright portion and the dark portion of the image Accordingly, image quality of a corresponding area may be significantly deteriorated. To address this problem, a WDR image process has been developed.

The WDR process enables generation of an image, where both a bright portion and a dark portion of an image are clearly viewable, by fusing a short exposure image and a long exposure image. The exposure time of the short exposure images is adjusted to be short so that a bright portion of an image may be clearly viewed, and the exposure time of the long exposure image is adjusted to be long so that a dark portion of the image may be clearly viewed.

However, when a moving object appears in an actual image, motion artifacts may be generated in the image to which the WDR process is performed.

Accordingly, when applying the WDR process, an image processing technique of correcting the motion artifacts is required.

SUMMARY OF THE INVENTION

Exemplary embodiments address at least the above problems and/or disadvantages and other disadvantages not described above. Also, the exemplary embodiments are not required to overcome the disadvantages described above, and an exemplary embodiment may not overcome any of the problems described above.

One or more exemplary embodiments provide an apparatus and method for processing an image, whereby motion artifacts, which may occur in a WDR process, may be corrected.

According to an aspect of an exemplary embodiment, there is provided an image processing apparatus comprising: an image input unit configured to receive a long exposure image and a short exposure image that have different exposure times; a motion artifact area detecting unit configured to detect a motion artifact area resulting from fusion of the long exposure image and the short exposure image; a non-linear gain adjusting unit configured to generate a non-linear gain control short exposure image by non-linearly adjusting a gain of the received short exposure image, wherein the adjusting adjusts a luminance component of the short exposure image to correspond to a luminance component of the long exposure image, and the non-linear gain adjusting unit is further configured to compensate for motion in the generated non-linear gain control short exposure image based on the detected motion artifact area; and a fusing unit configured to fuse the non-linear gain control short exposure image and the long exposure image to output an image to which a wide dynamic range (WDR) process is performed.

According to another aspect of an exemplary embodiment, there is provided a method of processing an image, the method comprising: receiving, by using an image sensor, a long exposure image and a short exposure image having different exposure times; detecting a motion artifact area resulting from fusion of the long exposure image and the short exposure image to generate position information of the detected motion artifact area and weight information to be applied to the detected motion artifact area; non-linearly adjusting a gain of the short exposure image to generate a non-linear gain control short exposure image, wherein the non-linearly adjusting adjusts a luminance component of the short exposure image to correspond to a luminance component of the long exposure image; compensating for motion in the non-linear gain control short exposure image based on the detected motion artifact area; and fusing the non-linear gain control short exposure image and the long exposure image to output an image to which a wide dynamic range (WDR) process is performed.

According to another aspect of an exemplary embodiment, there is provided an image processing apparatus comprising: a motion artifact area detecting unit configured to detect a motion artifact area resulting from a fusion of a long exposure image and a short exposure image; and a non-linear gain adjusting unit configured to generate a non-linear gain control short exposure image by non-linearly adjusting a gain of the short exposure image, and further configured to compensate for motion in the non-linear gain control short exposure image based on the motion artifact area.

BRIEF DESCRIPTION OF THE DRAWINGS

The above and/or other aspects will be more apparent by describing certain exemplary embodiments with reference to the attached drawings, in which:

FIG. 2B is a schematic flowchart illustrating an image processing method, according to an exemplary embodiment;

FIG. 4B is a schematic flowchart illustrating an image processing method that may be performed by using a non-linear gain adjusting unit illustrated in FIG. 4A, according to an exemplary embodiment;

FIG. 5A is a schematic flowchart illustrating a method of compensating for motion within a non-linear short exposure image based on motion artifact areas according to an exemplary embodiment;

DETAILED DESCRIPTION OF THE INVENTION

Figure 1A:
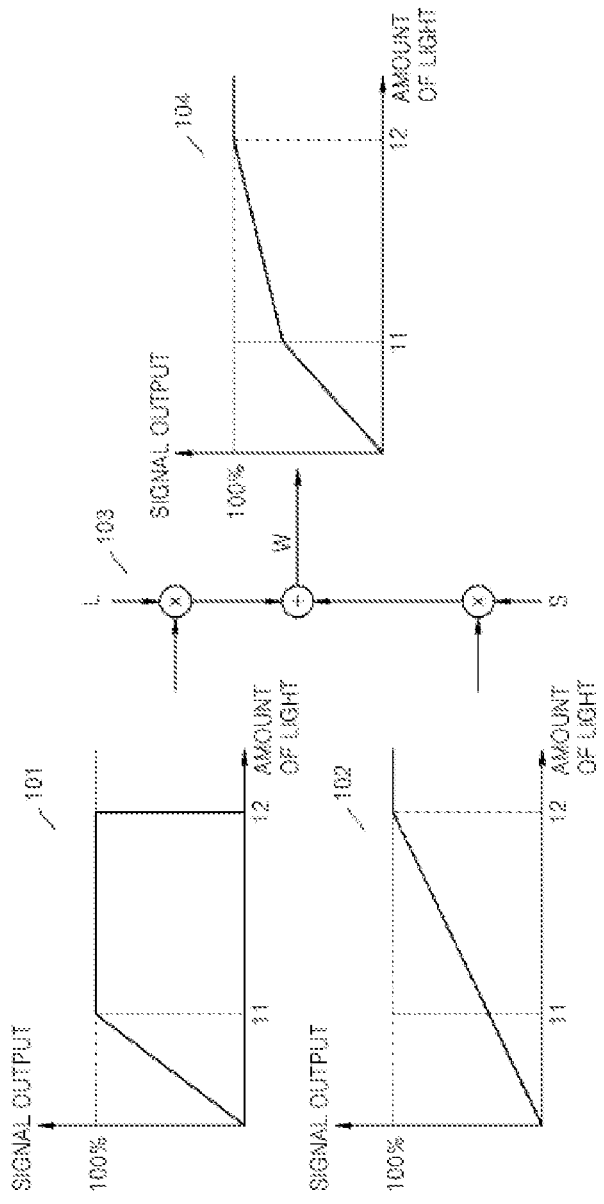
FIGS. 1A through 1C are schematic views illustrating a WDR process and motion artifacts generated in the WDR process according to the related art.

The following description exemplifies only the principles of certain exemplary embodiments. Even if they are not described or illustrated clearly in the present specification, those of ordinary skill in the art can embody the principles of the exemplary embodiments and invent various apparatuses within the concept and scope of the exemplary embodiments. The use of the conditional terms and exemplary embodiments presented in the present specification are intended only to make the concept of the exemplary embodiments understood, and they are not limited to the exemplary embodiments and conditions mentioned in the specification. In addition, all of the detailed description on the principles and viewpoints of the exemplary embodiments should be understood to include structural and functional equivalents. The equivalents include not only currently known equivalents, but also those to be developed in future, that is, all devices invented to perform the same function, regardless of their structures.

Therefore, functions of various devices illustrated in the drawings, including a functional block expressed as a processor or a similar concept, can be provided not only by using hardware dedicated to the functions, but also by using hardware capable of running proper software for the functions. When a function is provided by a processor, the function may be provided by a single dedicated processor, single shared processor, or a plurality of individual processors, part of which can be shared. The use of a term, 'processor', 'control' or similar concept, should not be understood to exclusively refer to a piece of hardware capable of running software, but should be understood to include a digital signal processor (DSP), hardware, ROM, RAM, and non-volatile memory for storing software, implicatively. Other known and commonly used hardware may also be included therein.

The foregoing objects, features, and advantages will be more apparent from the following detailed description made with reference to the accompanying drawings. Also, well-known techniques or constructions are omitted or not described in detail since they would obscure the exemplary embodiments with unnecessary detail.

When a part "includes" a component, it means that the part does not include components other than the mentioned component, but may include other components, provided that there is no special indication to the contrary.

Hereinafter, an exemplary embodiment will be described in detail with reference to the accompanying drawings.

As used herein, the term "and/or" includes any and all combinations of one or more of the associated listed items. Expressions such as "at least one of," when preceding a list of elements, modify the entire list of elements and do not modify the individual elements of the list.

Although performance of image processing apparatuses, such as digital cameras, is continuously being improved, loss of information of a bright area or a dark area is caused in a charge coupled device (CCD) or a complementary metal oxide semiconductor (CMOS) sensor of the related art, used in obtaining an image, due to the limitation in a dynamic range. A dynamic area refers to a ratio of luminance between the brightest area and the darkest area of an image. Because the dynamic area of a sensor used in an image obtaining apparatus is very small compared to the dynamic area of an actual scene, a bright range of the actual scene may not be expressed completely.

FIG. 1A is a schematic view illustrating a WDR process of the related art whereby an image having a wide dynamic range, with which a luminance range of an actual scene may be expressed, is generated.

Referring to FIG. 1A, in a WDR process, a long exposure image signal 101 is obtained in a long period of exposure time and a short exposure image signal 102 is obtained in a short period of exposure time. Predetermined exposure signal processing 103 is performed in which exposure balances of the long exposure image and the short exposure image are adjusted by differently applying weights to the long exposure image and the short exposure image according to light amounts, and then the images may be fused to generate an image 104 having a wide dynamic scope. For example, if a dynamic scope of a photographing apparatus is 60 dB, an image having a dynamic range of about 120 dB may be obtained by the WDR process.

Figure 1B:
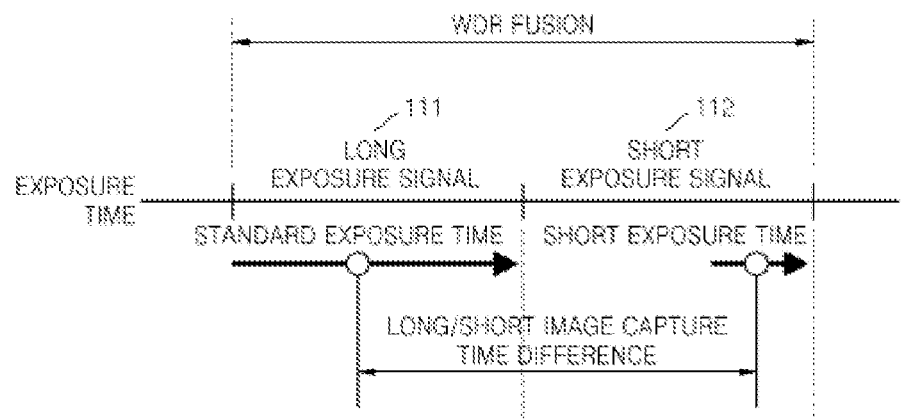
Figure 1C:
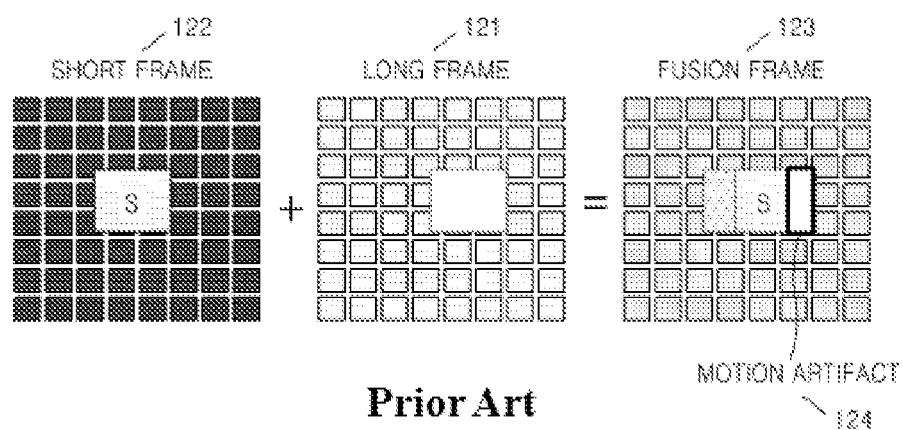

FIG. 1B illustrates an operation of sensing a long exposure image and a short exposure image by using a long/short variable exposure method in a WDR process of the related art. FIG. 1C illustrates motion artifacts generated in the WDR process of the related art.

Referring to FIG. 1B, according to the long/short variable exposure method, a shutter is controlled by selectively adjusting an exposure time for each frame, thereby obtaining a long exposure image and a short exposure image, which are required for the WDR process.

A long exposure signal 111 is obtained during a standard exposure time applied when photographing a frame with an image sensor. One long frame 121 (see FIG. 1C) may be configured based on the long exposure signal 111. A short exposure signal 112 is obtained during an exposure time that is relatively short with respect to the standard exposure time. A short frame 122 (see FIG. 1C) may be configured based on the short exposure signal 112.

When a long frame 121 and a short frame 122 are alternately obtained by using the long/short variable exposure method illustrated in FIG. 1B, motion artifacts 124 may be generated in a fusion frame 123, in which a long exposure image and a short exposure image are fused. The motion artifacts 124 in the fusion frame 123 are due to a time difference between an image capturing time of the long frame 121 and an image capturing time of the short frame 122. In particular, motion artifacts occur more often when a fast moving object is included in an image.

Figure 2A:
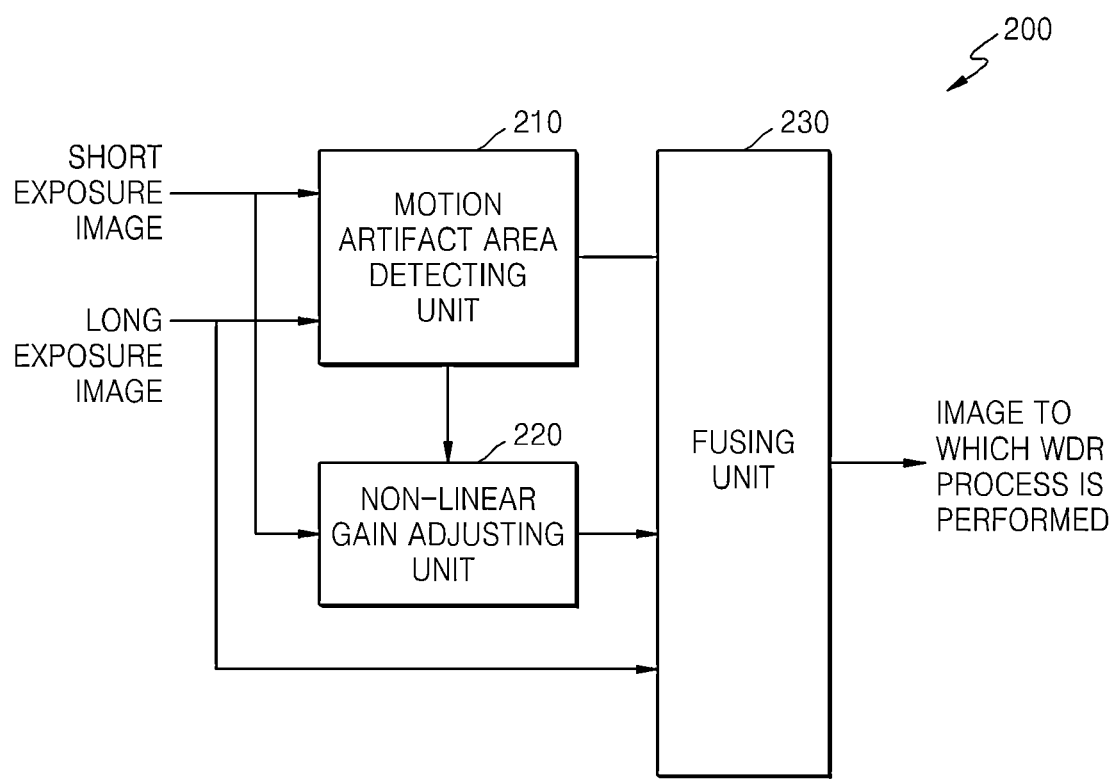
FIG. 2A is a schematic structural diagram illustrating an image processing apparatus, according to an exemplary embodiment.

FIG. 2A is a schematic block structural diagram of an image processing apparatus 200, according to an exemplary embodiment, and FIG. 2B is a schematic flowchart illustrating an image processing method that may be performed by using the image processing apparatus 200 according to an exemplary embodiment. Referring to FIGS. 2A and 2B, the image processing apparatus 200, according to the current exemplary embodiment, includes a motion artifact area detecting unit 210, a non-linear gain adjusting unit 220, and a fusing unit 230. The image processing apparatus 200 obtains a long exposure image and a short exposure image by using an image sensor (not illustrated) to selectively adjust an exposure time of each frame in operation S201.

At least a portion of the motion artifact area detecting unit 210, the non-linear gain adjusting unit 220, and the fusing unit 230 of the image processing apparatus 200 may be implemented by software, including at least one of an operating system, an application program module, and other program modules, and may be physically stored in various memory devices which are well-known in the art. Also, the software module, as described above, may also be stored in a remote memory device that is capable of communicating with the image processing apparatus 200. Examples of the software module include a routine that executes particular functions or a particular abstract data type that will be described later, a sub-routine, a program, an object, a component, and a data structure. However, the exemplary embodiment are not limited thereto.

The non-linear gain adjusting unit 220 generates a non-linear gain control short exposure image by non-linearly adjusting a gain of a short exposure image such that a luminance component $Y_S$ of the short exposure image corresponds to a luminance component $Y_L$ of a long exposure image, in operation S202. According to an exemplary embodiment, image signals of the long exposure image and the short exposure image that are obtained by using an image sensor of an image processing apparatus are input as a Bayer pattern having a R-G-G-B array consisting of R in 25%, G in 50%, and B in 25%. Accordingly, the non-linear gain adjusting unit 220 calculates a maximum color for each unit area of the Bayer pattern, and calculates a gain value corresponding to the maximum color of each unit area based on a non-linear curve that is obtained by non-linearly adjusting a gain of a short exposure image such that a luminance component of the short exposure image corresponds to a luminance component of a long exposure image.

The motion artifact area detecting unit 210 detects a motion artifact area based on the long exposure image and the short exposure image, in operation S203, and transfers a detection result to the non-linear gain adjusting unit 220. According to an exemplary embodiment, a motion artifact area refers to an area where a difference in motion information between a long exposure image and a short exposure image is generated. The motion artifact area detecting unit 210 detects a position of a motion artifact area as described above, and transfers a weight, which is to be applied to a corresponding motion artifact area, to the non-linear gain adjusting unit 220, together with a position of the detected motion artifact area.

While operations S202 and S203 are illustrated in a sequential order, the order may be changed, and the operations may be performed in parallel or simultaneously by using an additional processor circuit or component. The order of the two operations is not limited thereto.

In operation S204, based on the motion artifact area detected in operation S203, the non-linear gain adjusting unit 220 compensates for motion in a non-linear gain control short exposure image generated in operation S202. If a motion artifact area is detected, it indicates that there is a difference in motion information between a long exposure image and a short exposure image, and accordingly, the non-linear gain adjusting unit 220 compensates for this difference with respect to the non-linear gain control short exposure image.

In operation S205, in order to output an image to which a WDR process is performed, the fusing unit 230 fuses the non-linear gain control short exposure image, which is compensated for motion in operation S204, and the long exposure image obtained in operation S201.

Figure 3A:
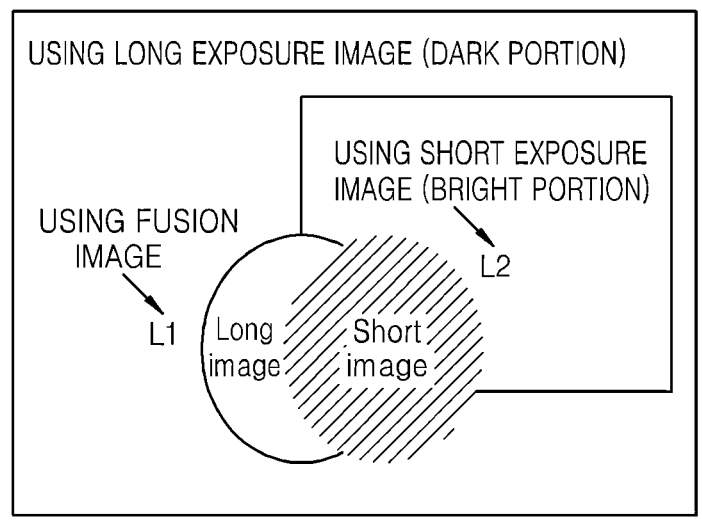
FIG. 3A is a schematic view illustrating motion artifacts that may occur when fusing the long exposure image and the short exposure image, according to a difference in photographing times of a long exposure image and a short exposure image according to an exemplary embodiment.
Figure 3A:
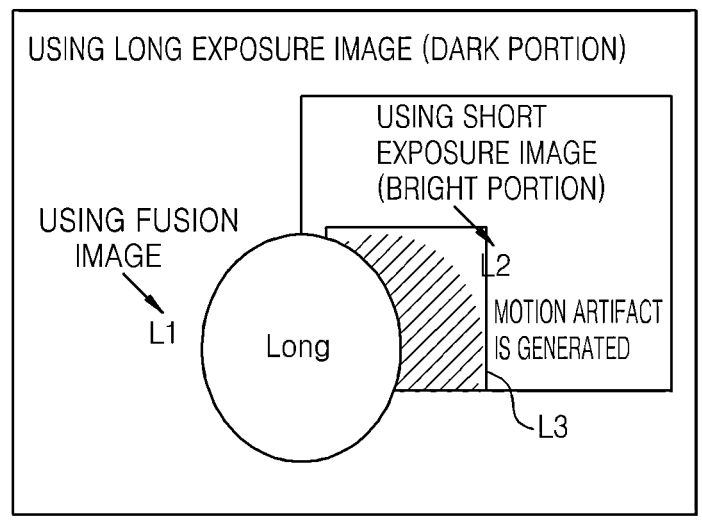
Figure 3B:
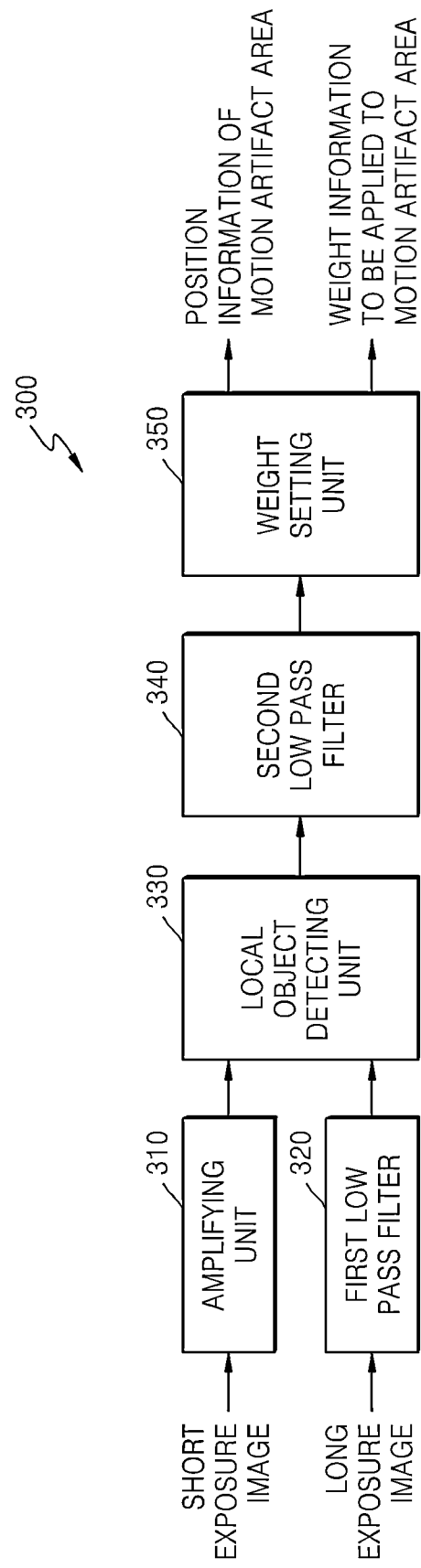
FIG. 3B is a schematic structural block diagram illustrating a motion artifact area detecting unit that detects motion artifacts illustrated in FIG. 3A, according to an exemplary embodiment.

FIG. 3A is a schematic view for illustrating motion artifacts, which may occur when the long exposure image and the short exposure image are fused because of a difference in image capturing times of a long exposure image and a short exposure image, according to an exemplary embodiment. FIG. 3B is a structural block diagram illustrating a motion artifact area detecting unit 300 that detects a motion artifact, as illustrated in FIG. 3A, according to an exemplary embodiment.

Referring to FIG. 3A, if there is a moving object, motion blur occurs in a portion L3 corresponding to a motion of the moving object around a portion L1 where a long exposure image and a short exposure image are fused with each other. The motion blur is due to a time difference between image capturing times of the long exposure image and the short exposure image when the images are obtained, particularly, according to a long/short variable exposure method. This is referred to as motion artifacts.

Referring to FIG. 3B, the motion artifact area detecting unit 300 includes an amplifying unit 310, a first low pass filter 320, a local object detecting unit 330, a second low pass filter 340, and a weight setting unit 350.

The amplifying unit 310 amplifies a short exposure image by a ratio of an exposure time of the long exposure image to an exposure time of a short exposure image in order to compensate for the difference in the exposure times of the short exposure image and the long exposure image.

For example, when a shutter speed of a short exposure image is x1/10 and a shutter speed of a long exposure image is x1, the short exposure image may be amplified by 10, which is the ratio of the shutter speed.

When the long exposure image is fused with the short exposure image, the first low pass filter 320 smoothes an area of the long exposure image, and the smoothed area is formed as a boundary.

The local object detecting unit 330 detects an area where a difference between a long exposure image and a short exposure image is equal to or greater than a threshold value Thr, as a local object. The difference between the long exposure image and the short exposure image may be calculated by using a Sum of Absolute Difference (SAD) algorithm. The local object refers to an area where motion artifacts are expected to occur when the long exposure image and the short exposure image are later fused.

The second low pass filter 340 performs smoothing with respect to a portion of an area that is detected as a local object, which is to form a boundary of the area.

The weight setting unit 350 sets a weight that is to be applied when fusing a long exposure image and a short exposure image with respect to a detected local object area. The weight may be set in advance, may be set according to luminance levels of the long exposure image and the short exposure image, or may be set according to whether there are motion artifacts or not.

Figure 4A:
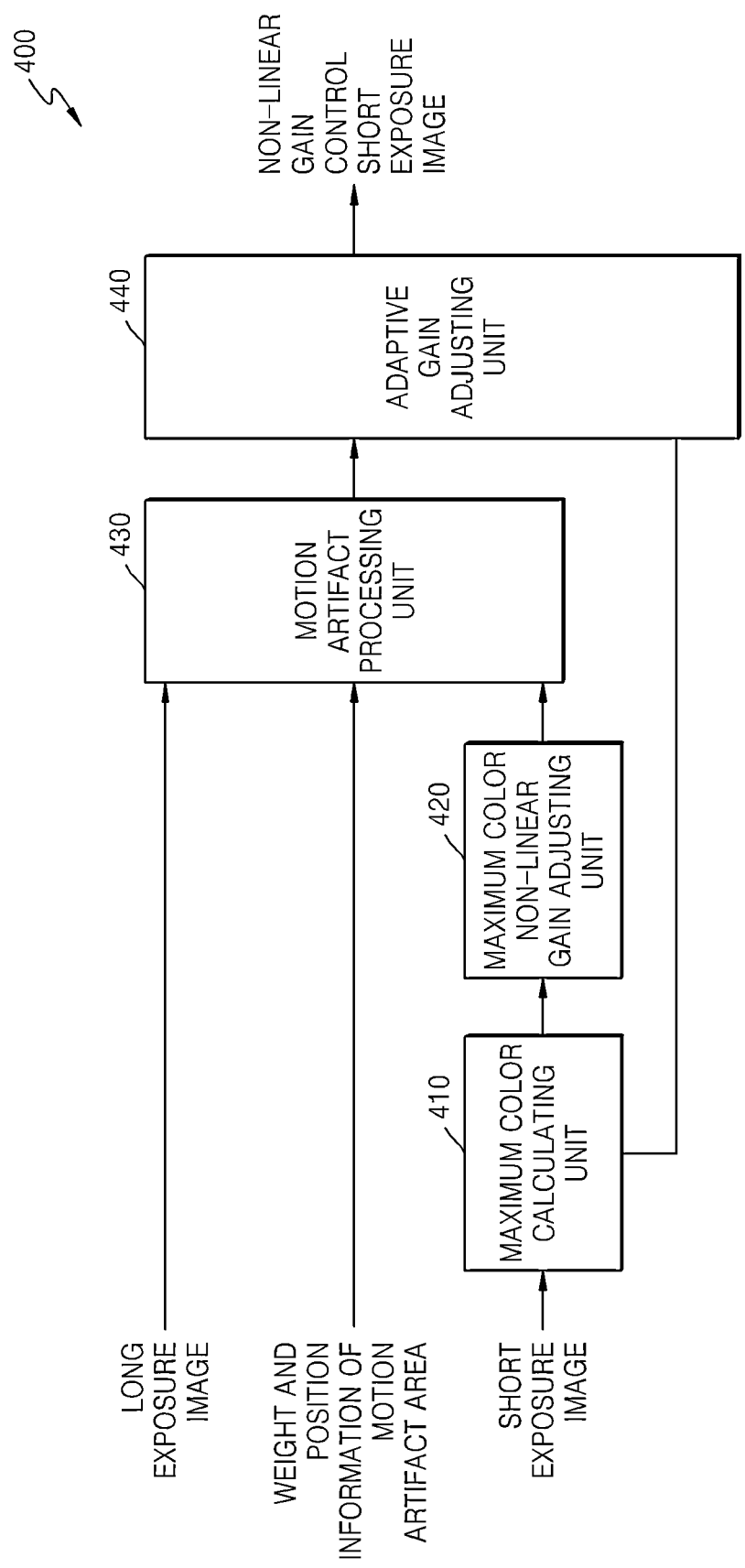
FIG. 4A is a schematic structural block diagram illustrating a non-linear gain adjusting unit that is an element of an image processing apparatus, according to an exemplary embodiment.
Figure 4C:
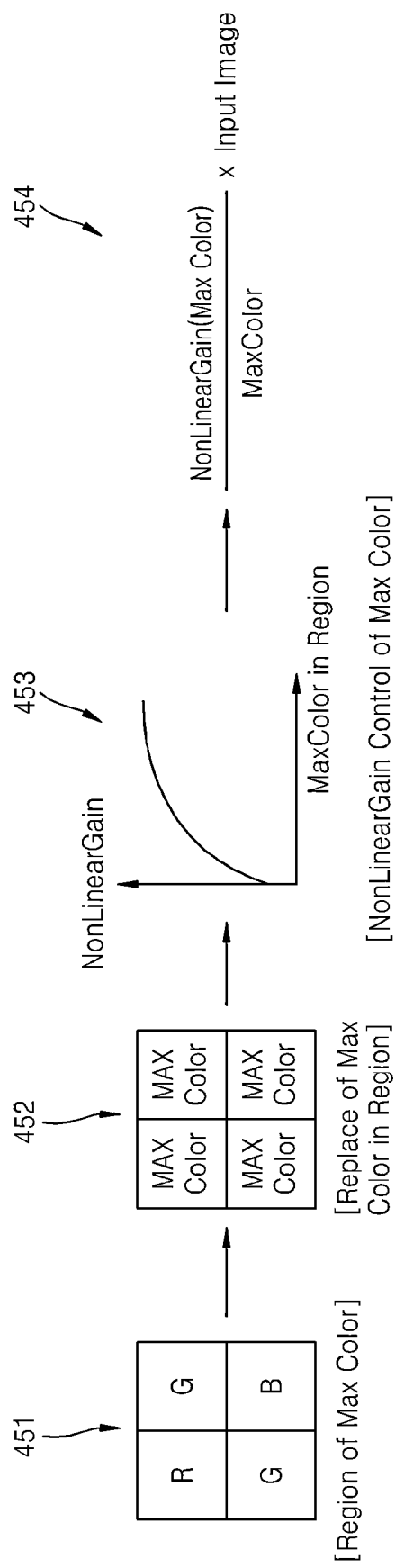
FIG. 4C is a schematic view illustrating an operation of the image processing method illustrated in FIG. 4B.

FIG. 4A is a schematic structural block diagram illustrating a non-linear gain adjusting unit 400 that is an element of an image processing apparatus, according to an exemplary embodiment. FIG. 4B is a schematic flowchart illustrating an image processing method that may be performed by using the non-linear gain adjusting unit 400 illustrated in FIG. 4A, according to an exemplary embodiment. FIG. 4C is a schematic view illustrating a detailed operation of the image processing method illustrated in FIG. 4B.

Referring to FIG. 4A, the non-linear gain adjusting unit 400 includes a maximum color calculating unit 410, a maximum color non-linear gain adjusting unit 420, a motion artifact processing unit 430, and an adaptive gain adjusting unit 440. The non-linear gain adjusting unit 400 may improve a contrast ratio between a bright portion and a dark portion of an input short exposure image, and generate a histogram that provides, by reflecting the improved contrast, information about a contrast of the short exposure image and distribution in the contrast.

The maximum color calculating unit 410 selects a Bayer pattern area 451 (see FIG. 4C) in a 2×2 array based on current pixels of a short exposure image, selects the maximum color from the corresponding Bayer pattern area in operation S401, and generates a maximum color plane 452 (see FIG. 4C) in which all of corresponding Bayer pattern areas are replaced with the selected maximum colors in operation S402.

The maximum color non-linear gain adjusting unit 420 calculates a non-linear gain value corresponding to the maximum color of the corresponding Bayer pattern areas based on a non-linear curve 453 (see FIG. 4C), in operation S403. According to the current exemplary embodiment, the non-linear curve 453, which is used to calculate a non-linear gain value, may be generated when normalizing each area of a luminance component of a short exposure image so as to correspond to each area of a luminance component of a long exposure image. A luminance component of a short exposure image corresponding to a luminance component of a long exposure image may be classified in three areas: a low luminance area, a middle luminance area, and a high luminance area. Different coefficients may be applied to each luminance component area so as to form a linear curve of each of the luminance component areas. A non-linear curve may be formed by connecting the respective linear curves.

As expressed in Equation 1 (see reference numeral 454 in FIG. 4C) below, a non-linear gain control short exposure image is generated in operation S404 by adjusting the non-linear gain of the short exposure image based on a calculated maximum color MaxColor and a non-linear gain value Non-LinearGain(MaxColor) corresponding to the calculated maximum color MaxColor.

NonLinearGain(MaxColor)/MaxColor*Input Pixel Image   [Equation 1]

In the current exemplary embodiment, when non-linear gain adjustment is performed by using the calculated maximum color of the Bayer pattern area, even when an image has not yet been processed for white balancing, a non-linear gain may be controlled without color distortion.

Furthermore, when the motion artifacts detecting unit 300 described above succeeds in detecting a motion artifact area in operation S405, motion within the non-linear gain control short exposure image is compensated based on the detected motion artifact area, in operation S406.

Figure 5B:
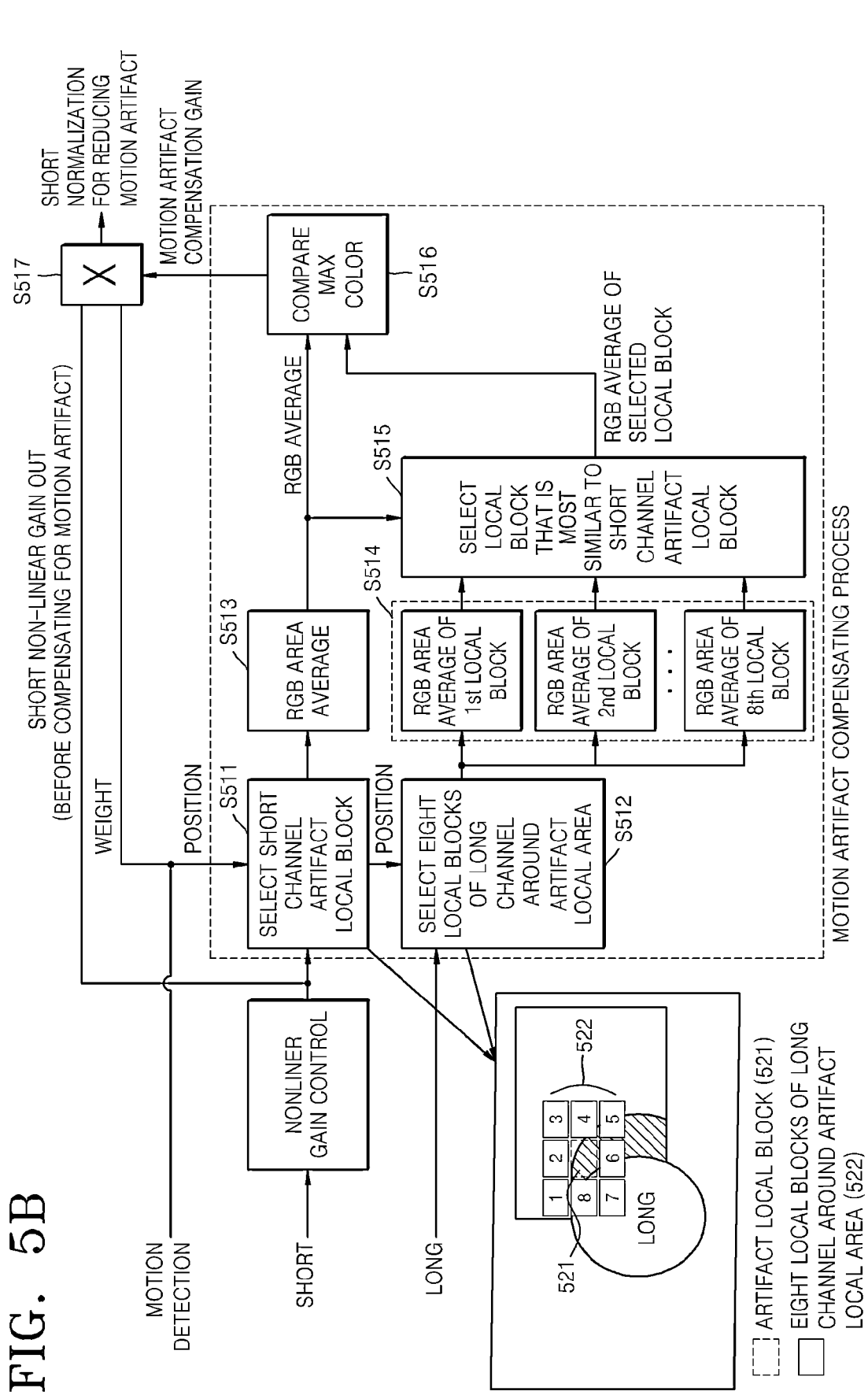
FIG. 5B is a schematic view of algorithms of a motion compensation method illustrated in FIG. 5A.

FIG. 5A is a schematic flowchart illustrating a method of compensating motion within a non-linear short exposure image based on a motion artifact area according to an exemplary embodiment. FIG. 5B is a schematic view of an algorithm of a motion compensation method illustrated in FIG. 5A. The motion compensating method illustrated in FIGS. 5A and 5B may be performed by using the image processing apparatus 200 illustrated in FIG. 2 and/or the non-linear gain adjusting unit 400 illustrated in FIG. 4A, which are described above in detail.

In the current exemplary embodiment that when the motion artifact detecting unit 300 described above has detected a motion artifact area, information about a position of the detected motion artifact area and a weight to be applied to the motion artifact area are input.

In operations S501 and S511, an artifact local block 521 of a non-linear gain control short exposure image is set based on position information of a motion artifact area input by using the above-described motion artifacts detecting unit 300.

In addition, in operations S502 and S512, eight local blocks 522 around the artifact local block 521 of a long exposure image are set based on the position information of the motion artifact area input by using the above-described motion artifacts detecting unit 300.

In operation S503, S513, and S514, red-green-blue (RGB) area averages of the artifact local block 521 of the non-linear gain control short exposure image and RGB area averages of the respective eight local blocks 522 of the long exposure image around the motion artifact are calculated.

In operations S504 and S515, the RGB area average of the artifact local block 521 of the non-linear gain control short exposure image is compared with the RGB area averages of the eight local blocks 522 of the long exposure image around the motion artifact to obtain a local block from among the local blocks of the long exposure image around the motion artifact that is most similar to the artifact local block 521.

To compare the artifact local block of the non-linear gain control short exposure image and the local blocks of the long exposure image around the motion artifact, a SAD algorithm may be used.

According to the series of the operations described above, the most similar information to a information of a position where motion artifacts are recognized in the short exposure image may be obtained from among information of a long exposure image. By normalizing a short exposure image based on the information that is most similar to the information of the position where motion artifacts are recognized, from among the long exposure image, the motion artifacts may be removed.

That is, in operation S505 and S516, a gain value for compensation of the motion artifacts is calculated by comparing the RGB area average of the artifact local block 521 and the RGB area averages of the local blocks 522 around the artifact local block.

As expressed in Equation 2 below, a weight of a motion artifact area input by using the above-described motion artifact detecting unit 300 and a gain value Motion_Artifact_gain for compensation of motion artifacts are applied to a short exposure image Short_NonLinearGain to compensate for motion within the non-linear gain control short exposure image. This is conducted in order to compensate for the motion artifact area with a high degree of softness.

Short_NonLinearGain_Motion_Artifact_removal=
    Short_NonLinearGain*
    (Motion_Artifact_gain*Weight)   [Equation 2]

As described above, according to the current exemplary embodiment, aside from compensation of an exposure degree between a long exposure image and a short exposure image in a WDR process, a portion of an image where a motion difference is caused, between a long exposure image and a short exposure image, is additionally compensated, thereby reducing artifacts due to motion.

Figure 6:
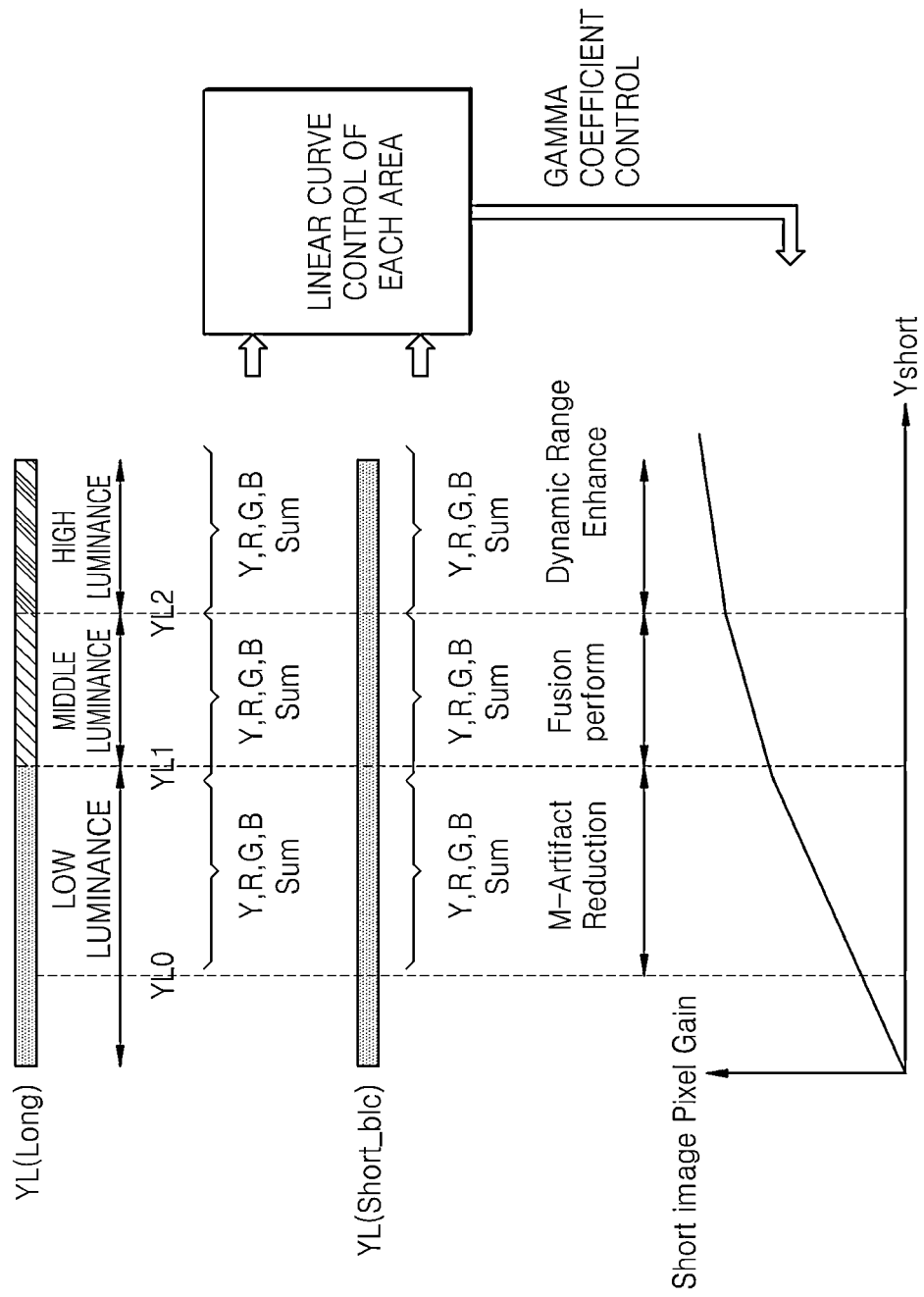
FIG. 6 illustrates an operation of normalizing a luminance component of a short exposure image, so as to conform with a luminance component of a long exposure image, according to an exemplary embodiment.

FIG. 6 illustrates an operation of normalizing a luminance component of a short exposure image to conform with a luminance component of a long exposure image, according to an exemplary embodiment. The method of normalizing a short exposure image according to the current exemplary embodiment may be performed by using the image processing apparatus 200 illustrated in FIG. 2A and/or the non-linear gain adjusting unit 400 illustrated in FIG. 4A, which are described above in detail.

According to the method of normalizing a short exposure image of an exemplary embodiment, luminance components of a short exposure image and a long exposure image are each classified in three areas: a low luminance area, a middle luminance area, and a high luminance area. Different weights are applied to the respective areas to generate a linear curve of each area.

When applying different weights to each area, a weight may be adjusted for the low luminance area so as to reduce motion artifacts of an image. A weight may also be adjusted for the middle luminance area so as to reduce noise of the image. A weight may also be adjusted for the high luminance area so as to widen a dynamic area of the image.

As described above, a non-linear curve having a non-linear gain value of a short exposure image may be generated by combining the linear curves generated for the respective areas.

Figure 7:
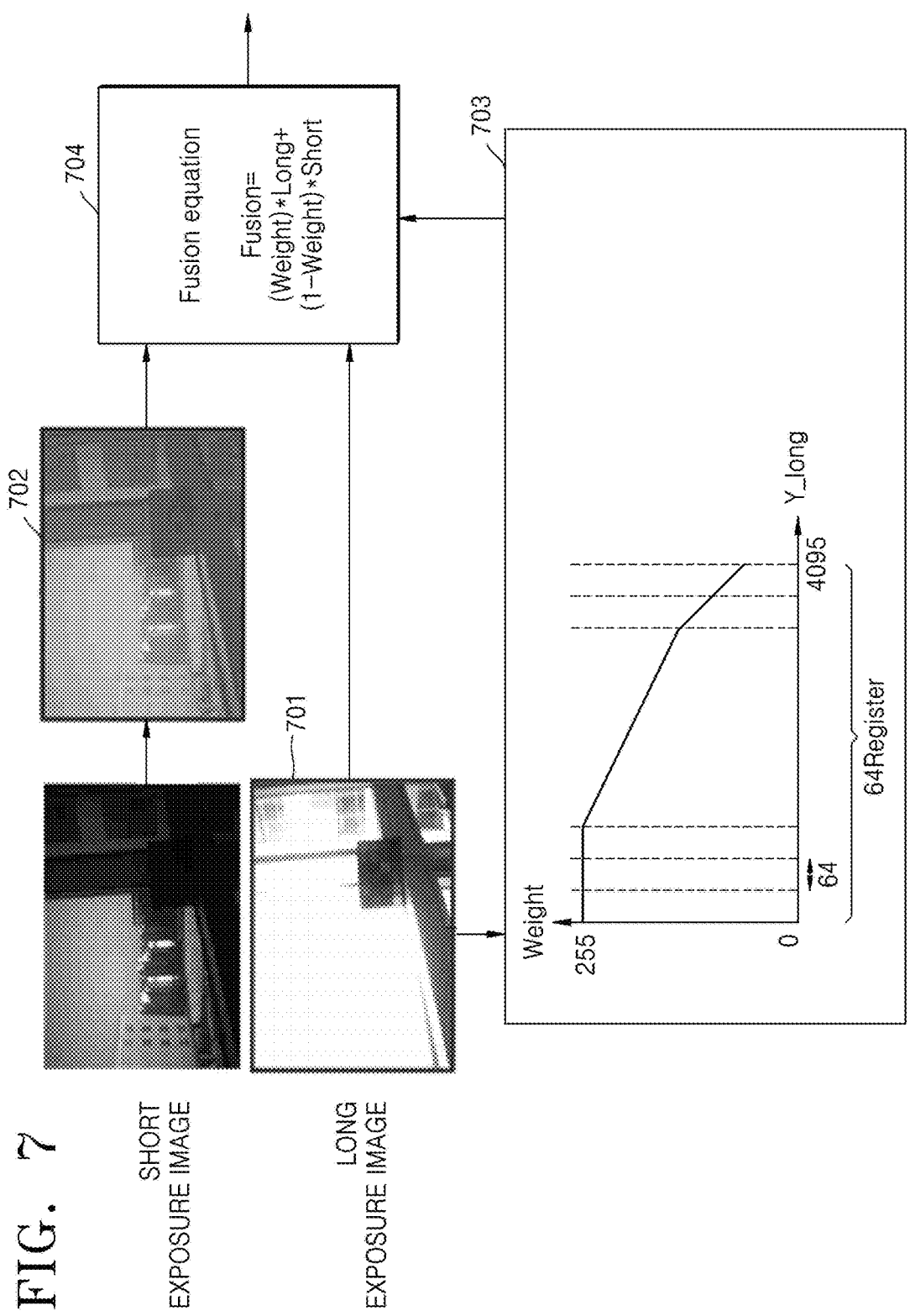
FIG. 7 illustrates an operation of fusing a long exposure image and a short exposure image, according to an exemplary embodiment.

FIG. 7 illustrates an operation of fusing a long exposure image and a short exposure image according to an exemplary embodiment. The method of fusing long and short exposure images may be performed by using the image processing apparatus 200 illustrated in FIG. 2A, which is described above in detail. Referring to FIG. 7, a long exposure image 701 obtained from an image sensor and a non-linear gain control short exposure image 702 that is output from the above-described non-linear gain adjusting unit 220 are fused with each other. When fusing the long exposure image 701 and the short exposure image 702, a weight curve is calculated in a piecewise manner based on luminance component values of the long exposure image 701 to calculate a fusion weight of the long exposure image 701 and the short exposure image 702. In addition, as expressed in Equation 3 below, a weight Motion_Detect_weight of a motion artifact area derived from the above-described motion artifact detecting unit 300 may be additionally applied. That is, fusion weights (Weight and 1−Weight) of a non-linear gain control short exposure image and a long exposure image may be adjusted based on the weight Motion_Detect_Weight of the motion artifact area.

$$\text{Fusion}=(\text{Weight}-\text{Motion\_Detect\_Weight})*\text{Long}+(1-(\text{Weight}-\text{Motion\_Detect\_Weight}))*\text{Short} \quad \text{[Equation 3]}$$

Figure 8:
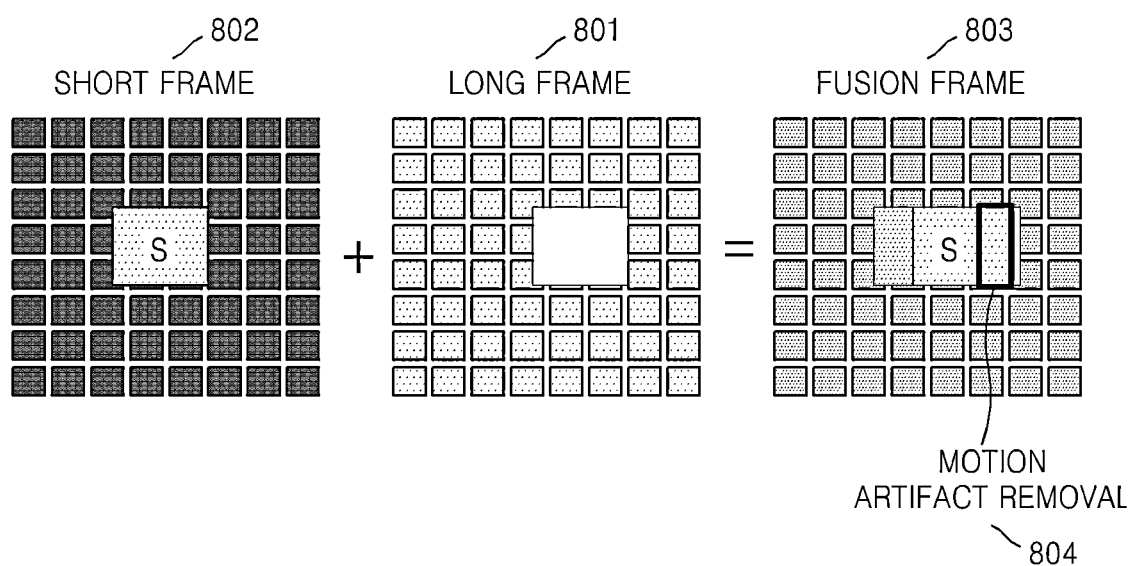
FIG. 8 illustrates a resultant image from which motion artifacts are removed, when an image processing method, according to an exemplary embodiment, is applied.

FIG. 8 illustrates a resultant image from which motion artifacts are removed, an image processing method according to an exemplary embodiment is applied. Referring to FIG. 8, when forming a fusion frame image 803 by fusing a long frame 801 and a short frame 802, a boundary area due to the motion artifact, as illustrated in FIG. 1C, may be smoothed as indicated by a reference numeral 804, thereby providing a frame image on which a more natural WDR process is performed.

As described above, according to the image processing method of the exemplary embodiment, unlike the WDR process of the related art, motion artifacts, which may occur due to a moving object when obtaining an image having a wide dynamic area, may be minimized.

The invention can also be embodied as computer readable codes on a computer readable recording medium. The computer readable recording medium is any data storage device that can store data that can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the exemplary embodiments pertain.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternative, modifications, and variations will be apparent to those skilled in the art.

What is claimed is:

1. An image processing apparatus comprising:
an image input unit configured to receive a long exposure image and a short exposure image that have different exposure times;
a motion artifact area detecting unit configured to detect a motion artifact area resulting from a fusion of the long exposure image and the short exposure image;
a non-linear gain adjusting unit configured to calculate a gain value corresponding to a maximum color of each unit area of a color filter array pattern of the short exposure image based on a non-linear curve, generate a non-linear gain control short exposure image by non-linearly adjusting a gain of the received short exposure image, wherein the non-linear curve is generated by normalizing each area of a luminance component of the short exposure image to correspond to each area of a luminance component of the long exposure image, and the non-linear gain adjusting unit is further configured to compensate for motion in the generated non-linear gain control short exposure image based on the detected motion artifact area; and
a fusing unit configured to fuse the non-linear gain control short exposure image and the long exposure image to output an image to which a wide dynamic range (WDR) process is performed.

2. The image processing apparatus of claim 1, wherein the image input unit is further configured to selectively adjust the exposure times of respective frames by using an image sensor to obtain the long exposure image and the short exposure image.

3. The image processing apparatus of claim 1, wherein the motion artifact area detecting unit is further configured to generate position information of the motion artifact area and weight information for the motion artifact area.

4. The image processing apparatus of claim 1, wherein the motion artifact area detecting unit comprises:
- an amplifying unit configured to amplify the short exposure image by a ratio of the exposure time of the short exposure image to the exposure time of the long exposure image;
- a first low pass filter configured to smooth an area of the long exposure image that is formed as a boundary between the short exposure image and the long exposure image resulting from the fusion of the short exposure image and the long exposure image;
- a local object detecting unit configured to detect the motion artifact area based on a difference between the long exposure image and the short exposure image;
- a second low pass filter configured to smooth an area to be formed as a boundary of the detected motion artifact area; and
- a weight setting unit configured to set a weight for the detected motion artifact area.

5. The image processing apparatus of claim 1, wherein the color filter array pattern is a Bayer pattern, the non-linear gain adjusting unit is further configured to calculate the maximum color of each unit area of the Bayer pattern.

6. The image processing apparatus of claim 5, wherein the non-linear curve is generated by classifying the luminance component of the short exposure image, corresponding to the luminance component of the long exposure image, into a plurality of luminance component areas according to a luminance level, by respectively applying different coefficients to the classified luminance component areas to respectively form linear curves corresponding to the each of the classified luminance component areas, and by connecting the respectively formed linear curves.

7. The image processing apparatus of claim 1, wherein the non-linear gain adjusting unit is further configured to position an artifact local block of the non-linear gain control short exposure image and local blocks of the long exposure image around the artifact local block based on position information of the detected motion artifact area, and configured to obtain a most similar local block to the artifact local block from among the local blocks of the long exposure image around the artifact local block to calculate a gain value of the short exposure image for compensating for the detected motion artifact area, based on a difference between the artifact local block and the local blocks of the long exposure image around the artifact local block.

8. The image processing apparatus of claim 7, wherein the non-linear gain adjusting unit is further configured to receive, from the motion artifact area detecting unit, a weight for the detected motion artifact area, and configured to compensate for the motion in the non-linear gain control short exposure image, based on the received weight and the calculated gain value of the short exposure image.

9. The image processing apparatus of claim 1, wherein the fusing unit is further configured to receive, from the motion artifact area detecting unit, a weight for the detected motion artifact area, and configured to adjust fusion weights of the non-linear gain control short exposure image and the long exposure image based on the received weight.

10. A method of processing an image, the method comprising:
- receiving, using an image sensor, a long exposure image and a short exposure image having different exposure times;
- detecting a motion artifact area resulting from a fusion of the long exposure image and the short exposure image to generate position information of the detected motion artifact area and weight information for the detected motion artifact area;
- non-linearly adjusting a gain of the short exposure image to generate a non-linear gain control short exposure image, wherein the non-linearly adjusting comprises calculating a gain value corresponding to a maximum color of each unit area of a color filter array pattern of the short exposure image based on a non-linear curve, and the non-linear curve is generated by normalizing each area of a luminance component of the short exposure image to correspond to each area of a luminance component of the long exposure image;
- compensating for motion in the non-linear gain control short exposure image based on the detected motion artifact area; and
- fusing the non-linear gain control short exposure image and the long exposure image to output an image to which a wide dynamic range (WDR) process is performed.

11. The method of claim 10, wherein in the receiving of the long exposure image and the short exposure image, the long exposure image and the short exposure image are obtained by selectively adjusting the exposure times of respective frames.

12. The method of claim 10, wherein the detecting of a motion artifact area comprises:
- amplifying the short exposure image by a ratio of the exposure time of the short exposure image to the exposure time of the long exposure image;
- smoothing, using a first low pass filter, an area of the long exposure image formed as a boundary between the short exposure image and the long exposure image resulting from the fusion of the short exposure image and the long exposure image;
- detecting the motion artifact area based on a difference between the long exposure image and the short exposure image;
- smoothing, using a second low pass filter, an area to be formed as a boundary of the detected motion artifact area; and
- setting a weight for the detected motion artifact area.

13. The method of claim 10, wherein the color filter array pattern is a Bayer pattern, and the non-linearly adjusting further comprises:
- calculating the maximum color for each unit area of the Bayer pattern of the short exposure image.

14. The method of claim 13, wherein the non-linear curve is generated by classifying the luminance component of the short exposure image, corresponding to the luminance component of the long exposure image, into a plurality of luminance component areas according to a luminance level, by respectively applying different coefficients to the classified luminance component areas to respectively form linear curves corresponding to the each of the classified luminance component areas, and by connecting the respectively formed linear curves.

15. The method of claim 10, wherein the compensating comprises:
- positioning an artifact local block of the non-linear gain control short exposure image based on the position information of the detected motion artifact area;
- setting local blocks of the long exposure image around the artifact local block based on the position information of the detected motion artifact area;
- obtaining a local block that is most similar to the artifact local blocks from among the set local blocks of the long exposure image around the artifact local block;

calculating a gain value of the short exposure image for compensating for the detected motion artifact area, based on a difference between the artifact local block and the set local blocks of the long exposure image around the artifact local block; and compensating for motion in the non-linear gain control short exposure image based on the calculated gain value of the short exposure image.

16. The method of claim 15, wherein in the compensating, motion in the non-linear gain control short exposure image is compensated for based on a weight for the detected motion artifact area and the calculated gain value of the received short exposure image.

17. The method of claim 10, wherein in the fusing, fusion weights of the non-linear gain control short exposure image and the long exposure image are adjusted based on the weight information for the detected motion artifact area.

18. An image processing apparatus comprising:

a motion artifact area detecting unit configured to detect a motion artifact area resulting from a fusion of a long exposure image and a short exposure image; and a non-linear gain adjusting unit configured to calculate a maximum color of each unit area of a color filter array pattern f the short exposure image, calculate a gain value corresponding to the maximum color based on a non-linear curve, and generate a non-linear gain control short exposure image based on the calculated gain value, and further configured to compensate for motion in the non-linear gain control short exposure image based on the motion artifact area, wherein the non-linear curve is generated by normalizing each area of a luminance component of the short exposure image to correspond to each area of a luminance component of the long exposure image.

19. The image processing apparatus of claim 18, further comprising a fusing unit configured to fuse the non-linear gain control short exposure image and the long exposure image to output an image to which a wide dynamic range (WDR) process is performed.

\* \* \* \* \*